(12) United States Patent
Kreuer et al.

(10) Patent No.: US 6,264,857 B1
(45) Date of Patent: Jul. 24, 2001

(54) PROTON CONDUCTORS WHICH ARE THERMALLY STABLE OVER A WIDE RANGE AND HAVE GOOD PROTON CONDUCTIVITIES

(75) Inventors: Klaus-Dieter Kreuer, Böblingen; Annette Fuchs, Weil der Stadt; Joachim Maier, Wiernsheim; Georg Frank, Tübingen; Thomas Soczka-Guth, Hofheim; Joachim Clauss, Frankfurt, all of (DE)

(73) Assignee: Aventis R search & Technology GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 09/242,036
(22) PCT Filed: Aug. 7, 1997
(86) PCT No.: PCT/EP97/04305
§ 371 Date: Jul. 2, 1999
§ 102(e) Date: Jul. 2, 1999
(87) PCT Pub. No.: WO98/07164
PCT Pub. Date: Feb. 19, 1998

(30) Foreign Application Priority Data

Aug. 9, 1996 (DE) .............................. 196 32 285

(51) Int. Cl.[7] .................................................. H01B 1/00
(52) U.S. Cl. ................... 252/500; 252/62.2; 252/63.3 R; 429/33; 204/296
(58) Field of Search .................................. 252/500, 62.2, 252/63.3 R; 429/33; 204/296

(56) References Cited

U.S. PATENT DOCUMENTS 5,599,639    2/1997    Samsone et al. ...................... 429/33

FOREIGN PATENT DOCUMENTS

WO 96/13872    5/1996    (WO) .

OTHER PUBLICATIONS

Abstract No. 5478642.
Abstract No. 97–292211.
Abstract No. 5271460.
Abstract No. 5704382.

*Primary Examiner*—Nechslus Ojcles
*Assistant Examiner*—D G Hamlin
(74) *Attorney, Agent, or Firm*—Frommer Lawrence & Haug

(57) ABSTRACT

Proton conductors comprising from 1 to 99% by weight of an acid and from 99 to 1% by weight of a nonaqueous amphoteric material which are thermally stable from −50° C. to 400° C. and have a proton conductivity of $\geq 10^{-5}$ S/cm. The invention further relates to membranes comprising the proton conductors of the invention, processes for preparing the membranes and their use in electrochromic cells, secondary batteries and electrochromic displays.

14 Claims, 2 Drawing Sheets

Figure 1:
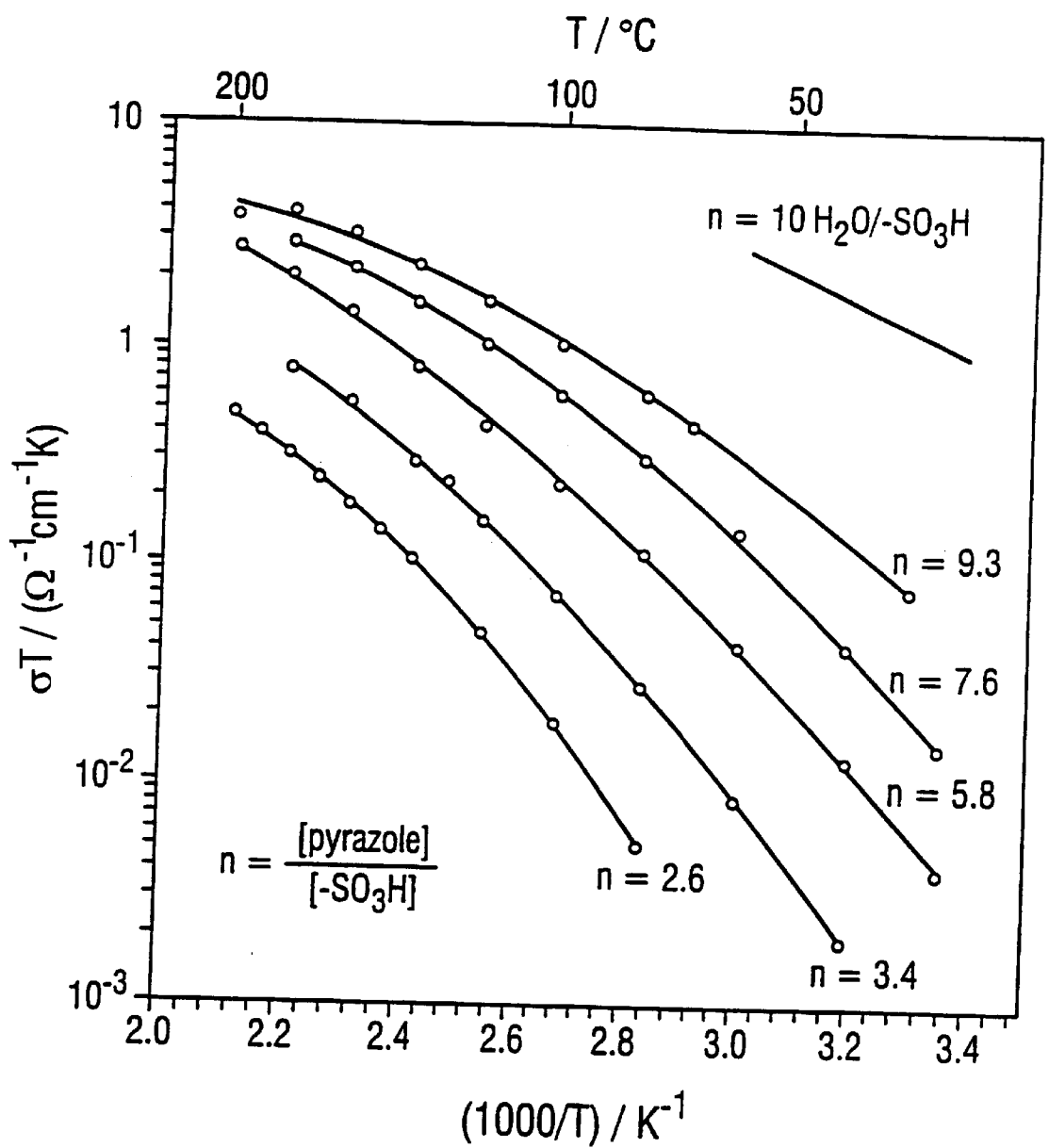

PROTON CONDUCTORS WHICH ARE THERMALLY STABLE OVER A WIDE RANGE AND HAVE GOOD PROTON CONDUCTIVITIES

The present invention relates to proton conductors which are thermally stable over a wide range and have high conductivities and also to their use in electrochemical cells, e.g. fuel cells, secondary batteries and electrochromic displays.

Proton conductors which are thermally stable above 100° C. are known from the literature. However, the known proton conductors have significant disadvantages.

Thus, proton-conducting mixtures of oxo acids or their salts (e.g. phosphoric acid, sulfuric acid, perchloric acid, etc. or their salts) and an amphoteric material consisting of water-free substances have usable proton conductivities only at temperatures of about 200° C. (Th. Dippel et al., Solid State Interionics, 1993, 61, 41; K. D. Kreuer et al., Chem. Mater., 1996, 8, 610–41). The power per unit weight (W/kg) and the power per unit volume (W/I) are unfavorably small compared to polymer electrolyte membranes (PEMs) because of the lower proton conductivity values. This limits the possible applications, in particular for use as proton-conducting membranes for fuel cells for mobile use.

Also known is the use of oxides, hydroxides and apatites as high-temperature proton conductors (Kreuer et al., Chem. Mater.; Vol. 8, No. 3, 1996, p. 615 ff). However, relatively good proton conductivities can be achieved with these materials only at temperatures above 500° C. In the intermediate and low temperature range they do not have a sufficient proton conductivity. The power per unit weight and the power per unit volume are, compared to PEMs, even lower than when using oxo acids and their salts (W. Dönitz, "Fuel Cells for Mobile Applications, Status, Requirements and Future Application Potential", Proc. Of the 11th World Hydrogen Conference, Dechema, Stuttgart, 1996, p. 1623).

The previously known proton-conducting polymer electrolyte membranes (PEMs) have high proton conductivities in a low temperature range ($\leq 100°$ C.) and when used in fuel cells make possible a rapid rise in power. Thus, for example, a Dow membrane comprising a perfluorinated polymer has a conductivity of 0.1–0.2S/cm at room temperature (G. A. Eisman, Journ. of Power Sources, Vol. 29, 1990, 389–398). The performance of proton-conducting membranes is significantly dependent on the ampholyte content and the acid content of the membrane. The known PEMs use water as ampholyte. This restricts the upper limit of the operating temperature to about 100° C. Above this limit, dehydration of the membrane occurs, resulting in a reduction in the performance of the membrane (proton conductivity and thus electric power output and also mechanical strength) (S. Gottesfeld et al., Polymer Electrolyte Fuel Cell Model, J. Electrochem. Soc., 1994, 141, L46–L50).

Although some of the proton conductors known from the prior art can be used at high temperatures (oxo acids, e.g. phosphoric acid, and also hydroxides, oxides and apatites), their power per unit weight and power per unit volume are both too small. At low temperatures, these systems do not have satisfactory proton conductivities.

Although polymer electrolyte membranes have good proton conductivities in the temperature range below 100° C., they are generally not very stable at temperatures above 100° C.

It is therefore an object of the invention to provide proton conductors which have good proton conductivities over a wide temperature range, have high chemical and electrochemical stability and possibly mechanical strength and are chemically resistant to attack by acid and bases. Furthermore, they should have a high power per unit volume and a high power per unit weight.

This object is achieved by the present invention by providing proton conductors which comprise 1–99% by weight, preferably from 10 to 90% by weight, in particular from 20 to 80% by weight, of an acid and 99–1% by weight, preferably from 90 to 10% by weight, in particular from 80 to 20% by weight, of a nonaqueous amphoteric material and are thermally stable in a temperature range up to 400° C., in particular from −50 to 300° C. The proton conductors of the invention have proton conductivities of $\geq 10^{-5}$ S/cm, in particular $\geq 10^{-3}$ S/cm, in this temperature range The acid present in the proton conductor of the invention and also the amphoteric material can be of low molecular weight or high molecular weight. Likewise, it is possible to use mixtures of low molecular weight and polymeric acids or amphoteric materials.

In a preferred embodiment, the proton-conducting mixture comprises a low molecular weight amphoteric material and a high molecular weight or low molecular weight acid, which may, if desired, be present in a high molecular weight polymer (as support), or a low molecular weight or high molecular weight amphoteric material and a low molecular weight acid.

For the purposes of the present invention, high molecular weight acids are, in particular, acids having a molecular weight of >1000 g/mol, preferably >2000 g/mol. The polymeric, high molecular weight acids used according to the invention have ionically dissociable, covalently bound groups which act as Brønsted proton donors toward the amphoteric material. Particular preference is given to using functionalized polyarylenes, halogenated aliphatic polymers or functionalized copolymers comprising aromatic and aliphatic monomer units.

Preferred functional substituents are, for example, —$SO_3M$, —$PO_3M_{1\,or\,2}$ or —COOM, where M is H, Na, K, Li, $NH_4$, Ag, Cu, Ca, Mg or Ba.

Examples of preferred high molecular weight acids are aromatic and aliphatic polymers, in particular perhalogenated, preferably perfluorinated, aliphatic polymers, and also polyether ketones, polyether sulfones, polyimides, polyphenylene sulfides, polyphenylene oxides and copolymers which comprise units from these polymers and are substituted by sulfonic acid groups ($SO_3M$), phosphoric acid groups ($PO_3M_{1\,or\,2}$) or carboxylic acid groups (COOM).

In a preferred embodiment, the acid is present as a polymer or bound to the amphoteric material. In this way, escape of the acid and thus contamination of the environment with the corrosive acid are avoided.

The low molecular weight acids having a molecular weight of $\leq 1000$ g/mol, preferably $\leq 500$ g/mol, which are present in the proton conductors of the present invention have, like the polymeric acids, ionically dissociable, covalently bound groups which act as Brønsted proton donors toward the amphoteric material. Preference is here given to using organic aromatic compounds and also halogenated aliphatic or aromatic compounds having covalently bound functional groups such as —$SO_3M$, —$PO_3M_2$, —COOM, —$B(OM)_2$ or —$CF_2SO_3M$, where M is as defined above. Particular preference is given to using organic aliphatic and aromatic sulfonic acids, e.g. p-toluenesulfonic acid, methylsulfonic acid or trifluoromethylsulfonic acid, and also aromatic and aliphatic carboxylic acids.

Also preferred are inorganic mineral acids such as sulfuric acid, phosphoric acid and perchloric acid.

It is possible to use either high molecular weight or low molecular weight amphoteric materials or mixtures of high molecular weight and low molecular weight amphoteric materials.

For the purposes of the present invention, high molecular weight amphoteric materials are, in particular, those which have a molecular weight of >1000 g/mol, preferably >2000 g/mol. As amphoteric materials, preference is given to using aliphatic, halogenated or unhalogenated polymers which have amphoteric groups in the side chain and aromatic polymers which have amphoteric structures in the main chain.

In particular, these are polymers or copolymers which have heteroaromatic or heterocyclic, in particular nitrogen-containing, structural units in the main or side chain.

Such structural units are, for example:

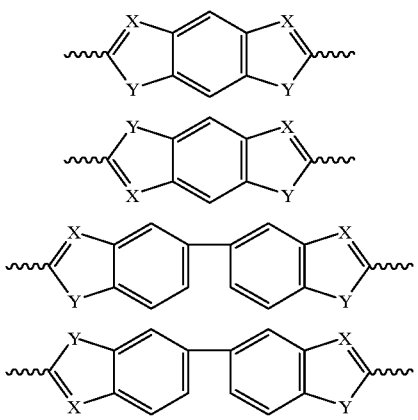

where X:O, S, NH R:CH$_3$, C$_2$H$_5$, C$_6$H$_5$, nC$_4$H$_9$, tC$_4$H$_9$, C$_6$H$_4$—CH$_3$, CF$_3$ Y:N, NR'$^+$ Preferred amphoteric groups are, for example, imidazole, benzimidazole, pyrazole, oxazole, carbazole, indole, isoindole, dihydrooxazole, isooxazole, thiazole, benzothiazole, isothiazole, benzimidazole, imidazolidine, indazole, 4,5-dihydropyrazole, 1,2,3-oxadiazole, furazane, 1,2,3-thiadiazole, 1,2,4-thiadiazole, 1,2,3-triazole, benzotriazole, 1,2,4-triazole, tetrazole, pyrrole, pyrrolidine or pyrazole groups.

In particular, the amphoteric material contains vinylimidazole, imidazole or pyrazole groups.

Examples of high molecular weight amphoteric materials which are preferably used are: polybenzimidazole, polybenzoxazoles, polybenzothiazoles or polyacrylamide.

For the purposes of the present invention, low molecular weight amphoteric materials are, in particular, those amphoteric materials which have a molecular weight of ≦1000 g/mol, preferably ≦500 g/mol.

Low molecular weight amphoteric materials which are used according to the invention are, for example:

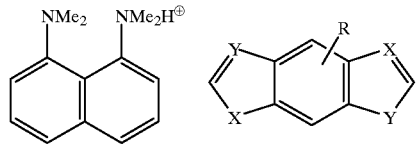

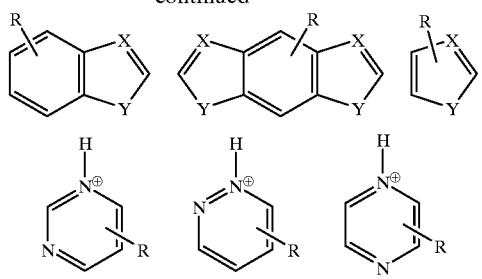

where
X: O, S, NH
Y: N, NR'$^+$
R: H, CH$_3$, C$_2$H$_5$, C$_6$H$_5$, nC$_4$H$_9$, tC$_4$H$_9$, CN, NO$_2$, F, Cl, Br, I, CO$_2$R', SO$_3$R'C$_6$H$_4$—CH$_3$, CF$_3$, C$_6$H$_4$'R'
R': H, CH$_3$, C$_2$H$_5$, C$_6$H$_5$, C$_6$H$_5$—CH$_3$, CF$_3$, C$_4$H$_9$
Me=CH$_3$.

Particular preference is given to low molecular weight compounds which contain imidazole, pyrazole or phenylimidazole groups as amphoteric groups.

The proton conductors of the invention are obtained by combining from 1 to 99% by weight, preferably from 10 to 90% by weight, in particular from 20 to 80% by weight, of the corresponding acid with 99–1% by weight, preferably 90–10% by weight, in particular 80–20% by weight, of the corresponding amphoteric material at temperatures in the range from −40° C. to 250° C., preferably from 20° C. to 100° C., in a solvent or in the absence of solvent.

Solvents which can be used are those solvents in general in which the acid and the amphoteric material dissolve or can be dispersed. Examples which may be mentioned are: N-methylpyrrolidone, dimethylacetamide, dimethylformamide, dimethyl sulfoxide, toluene and water. If required, the solvent can subsequently be removed, for example by evaporation.

The proton conductors of the invention can be used in the form of flowable compositions, for example as solution in an appropriate solvent or as dispersions, pastes or aerosols or the like, for coating articles, e.g. membranes, films or electrodes.

Furthermore, it is possible to coat a sheet-like structure, for example a membrane or a film, which comprises the, preferably polymeric, acid with a solution or dispersion comprising the, in particular low molecular weight, amphoteric material, or to carry out the coating process in the absence of solvent, if desired in the melt. The reverse procedure is likewise possible by bringing a sheet-like structure comprising the, preferably polymeric, amphoteric material into contact with the acid in solution or dispersion or in the molten state so as to coat the former.

The proton-conducting membranes or films obtained in the manner described have a high proton productivity over a very wide temperature range, preferably at temperatures up to +400° C., in particular from 50 to 250° C. The conductivities are, in particular, in the range ≧10$^{-5}$ S/cm, preferably ≧10$^{-3}$ S/cm. Unlike the known polymer electrolyte membranes, membranes comprising the proton conductors described have a high chemical and electrochemical stability in the temperature ranges stated. Furthermore, when employed in a fuel cell stack, the proton conductors of the invention are notable for a high power per unit weight, in particular >150 W/kg, preferably >190W/kg, and a high power per unit volume, in particular >300 W/l, preferably >350 W/l.

The proton conductors of the invention and also membranes or films comprising the proton conductors of the invention are, owing to their thermal stability, suitable for use both at high and low temperatures and are, due to their good chemical and physical stability and high proton conductivity, particularly well suited to use in electrochemical cells, in particular fuel cells or electrolysis units and also in secondary batteries or in electrochromic displays.

EXAMPLES

Sulfonated polyether ketone membrane (Hostatec®, Hoechst AG) treated with imidazole or benzimidazole/pyrazole.

A 40 µm thick membrane of sulfonated Hostatec (PEEK, degree of sulfonation: 72.5%) is brought into intimate contact with solid pyrazole or imidazole or benzimidazole. The membrane and the heterocycle are then brought to temperatures of 80–90° C. for pyrazole and 100–110° C. for imidazole or benzimidazole. The mixture is held at this temperature for 1–2 hours in order to achieve a uniform distribution of the heterocycle in the membrane. The amount of heterocycle introduced into the membrane can be controlled directly by means of the amount of heterocycle applied to the membrane. This method allows membranes having a heterocycle content of up to 200 percent by weight to be prepared.

Figure 2:
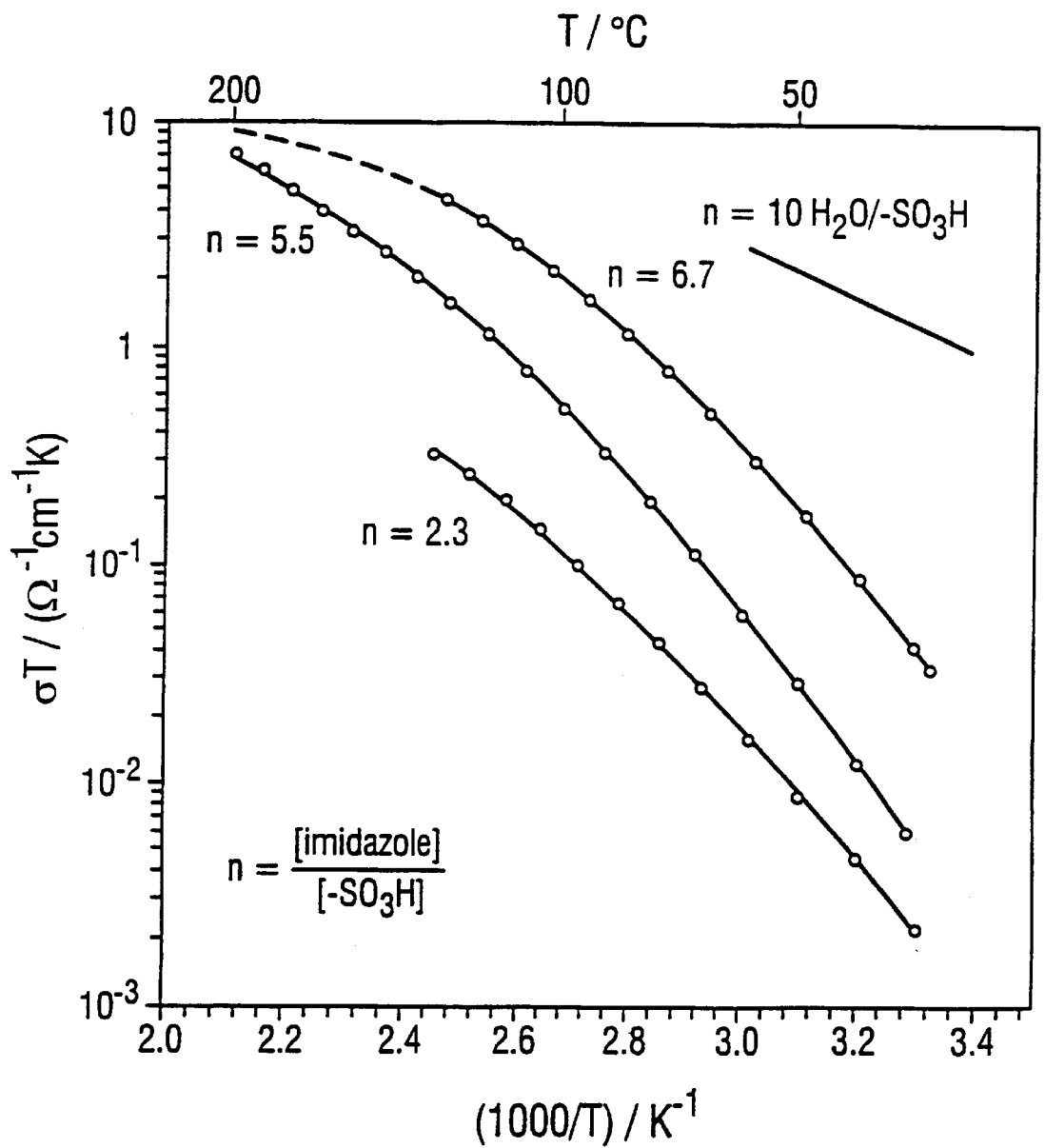

Typical dependencies of the proton conductivity on temperature and content of amphoteric material are shown in FIG. 1 and FIG. 2. The values were obtained from measurements using an impedance analyzer. Gold was used as electrode material.

Conductivity values achieved are 0.015 S/cm for imidazole with n=5 at 200° C.

0.010 S/cm for imidazole with n=6.7 at 200° C.

0.016 S/cm for imidazole with n=7 at 190° C.

0.010 S/cm for imidazole with n=9 at 130° C.

0.020 S/cm for pyrazole with n=9.3 at 200° C.

0.013 S/cm for benzimidazole with n=5 at 200° C.

n is the molar ratio of heterocycle to sulfonic acid groups on the polymer.

Conductivities of Mixtures:

EXAMPLE 2

Sulfanilic acid is intimately mixed with imidazole in a molar ratio of 10/90. The mixture displays a conductivity of 0.054 S/cm at 150° C.

EXAMPLE 3

Naphthalic acid is mixed with benzimidazole in a molar ratio of 10/90. The mixture displays a conductivity of 0.054 S/cm at 250° C.

EXAMPLE 4

Antimony(V) oxide (having a surface area of 320 m$^2$/g) is intimately mixed with benzimidazole in a molar ratio of 2:3.

A conductivity of 0.005 s/cm at 170° C. is achieved.

What is claimed is:

1. A proton conductor comprising an acid and a non-aqueous amphoteric material, wherein the acid is a high molecular weight or is a low molecular weight and/or polymeric acid, and wherein the amphoteric material is a low molecular weight amphoteric material having a molecular weight of $\leq 1000$ g/mol and wherein the acid is present in an amount of from 1 to 99% by weight and wherein the amphoteric material is present in an amount of from 99 to 1% by weight, and wherein the proton conductor is thermally stable in a temperature range up to 400° C. and has a proton conductivity of $\geq 10^{-5}$ S/cm in this temperature range.

2. A proton conductor as claimed in claim 1 which comprises a further low molecular weight and/or polymeric amphoteric material.

3. A proton conductor as claimed in claim 1, wherein the acid has ionically dissociable, covalently bound groups which act as Brønsted proton donors toward the amphoteric material.

4. A proton conductor as claimed in claim 1, wherein the high molecular weight acid is a functionalized polyarylene or halogenated or unhalogenated alphatic polymer or a functionalized copolymer comprising aromatic and aliphatic monomer units.

5. A proton conductor as claimed in claim 4, wherein the functional substituents present in the acid are —B(OM)$_2$, —SO$_3$M, —PO$_3$M$_1$ or $_2$, —COOM, or —CF$_2$—SO$_3$M groups, where M is H, Na, K, Li, Ag, Cu, Ca, Mg or Ba.

6. A proton conductor as claimed in claim 1, wherein the low molecular weight acid is an aromatic or aliphatic compound containing covalently bound functional groups or an inorganic mineral acid.

7. A proton conductor as claimed in claim 1, wherein the amphoteric material is an aromatic or aliphatic, halogenated or unhalogenated polymer.

8. A proton conductor as claimed in claim 1 for coating sheet-like structures, in particular membranes, films and electrodes.

9. A process for preparing a proton conductor as claimed in claim 1, which comprises bringing the acid and the amphoteric material into contact with one another at temperatures of from −40° C. to 250° C. in a solvent or, if desired, in the absence of solvent.

10. A proton conductor as claimed in claim 9, wherein the amphoteric material contains imidazole, vinylimidazole, pyrazole, oxazole, carbazole, indole, isoindole, dihydrooxazole, isooxazole, thiazole, benzothiazole, isothiazole, benzimidazole, imidazolidine, indazole, 4,5-dihydropyrazole, 1,2,3-oxadiazole, furazane, 1,2,3-thiadiazole, 1,2,4-thiadiazole, 1,2,3-triazole, benzotriazole, 1,2,4-triazole, tetrazole, pyrrole, pyrrolidine or pyrazole groups.

11. A membrane comprising a proton conductor as claimed in claim 1 which is thermally stable up to 400° C., and has a proton conductivity of $\geq 10^{-5}$ S/cm in this temperature range.

12. A process for preparing a membrane as claimed in claim 11, which comprises coating a membrane comprising the acid with a solution or dispersion comprising the amphoteric material or carrying out the coating process in the absence of solvent, if desired in the melt.

13. A process for preparing a membrane as claimed in claim 11, which comprises coating a membrane comprising the amphoteric material with a solution or dispersion comprising the acid or carrying out the coating process in the absence of solvent, if desired in the melt.

14. The use of a membrane as claimed in claim 11 in electrochemical cells, secondary batteries or electrochromic displays.

* * * * *